United States Patent
Yakovlev et al.

(10) Patent No.: US 11,503,082 B2
(45) Date of Patent: Nov. 15, 2022

(54) NETWORK SECURITY

(71) Applicant: F-Secure Corporation, Helsinki (FI)

(72) Inventors: Yury Yakovlev, Helsinki (FI); Gabor Gunyho, Helsinki (FI); Andrey Rusetskiy, Helsinki (FI)

(73) Assignee: F-Secure Corporation, Helsinki (FI)

( * ) Notice: Subject to any disclaimer, the term of this patent is extended or adjusted under 35 U.S.C. 154(b) by 183 days.

(21) Appl. No.: 16/881,634

(22) Filed: May 22, 2020

(65) Prior Publication Data

US 2020/0374319 A1 Nov. 26, 2020

(30) Foreign Application Priority Data

May 22, 2019 (GB) ...................................... 1907200

(51) Int. Cl.
*H04L 29/06* (2006.01)
*H04L 9/40* (2022.01)
*H04L 12/66* (2006.01)
*H04L 61/4511* (2022.01)

(52) U.S. Cl.
CPC ............ *H04L 63/205* (2013.01); *H04L 12/66* (2013.01); *H04L 61/4511* (2022.05); *H04L 63/0209* (2013.01); *H04L 63/145* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 2015/0365441 A1* | 12/2015 | Lemon | H04L 63/105 726/1 |
| 2016/0308875 A1* | 10/2016 | Judge | H04L 63/20 |
| 2017/0180380 A1 | 6/2017 | Bagasra | |
| 2018/0069878 A1 | 3/2018 | Martini | |
| 2018/0309712 A1 | 10/2018 | Jeong et al. | |

OTHER PUBLICATIONS

Search Report completed by the Intellectual Property Office of the United Kingdom in Application No. GB 1907200.8 dated Oct. 30, 2019. 1 page.

* cited by examiner

*Primary Examiner* — William J. Goodchild
(74) *Attorney, Agent, or Firm* — Meunier Carlin & Curfman LLC

(57) ABSTRACT

There is provided a network security method in a computer network. The method comprises detecting, by a gateway computer, a target device being connected to the computer network, detecting the target device transmitting a DNS query for resolving a hostname into an IP address, transmitting a query to a content rating system, wherein the query comprises the resolved hostname related to the DNS query of the target device, receiving, from the content rating system, a list of categorization categories assigned to the resolved hostname, determining a type of the target device on the basis of the received list of categorization categories assigned to the hostname, and generating a security related decision on the basis of the determined type of the target device.

20 Claims, 3 Drawing Sheets

NETWORK SECURITY

CROSS-REFERENCE TO RELATED APPLICATIONS

This application claims priority to, and the benefit of, United Kingdom Patent Application No. 1907200.8, filed May 22, 2019, which is incorporated by reference herein in its entirety.

Field of the Invention

The present invention relates to network security and more specifically to network security related to Internet of Things (IoT) devices.

DEFINITIONS

This specification uses definitions of IP protocol in RFC 791 and DNS system in RFC 1034 as examples of the embodiments as follows:

Target Device IP networking device, subject for classification as IoT device

Gateway IP networking device that forwards data packets between the Target Device and WAN or Internet DNS Interceptor Software component running in the Gateway and capable of intercepting DNS traffic from the Target Device Content Rating System Software system that matches hostname to the list of string labels (Content Categories) specifying the type of content available from the Internet resource Classifier Software component that updates the Report and runs the Classification Criteria check Report Document describing network activity of the Target Device Classification Criteria Function that takes variables from the Report and produces classification result

BACKGROUND

Rapid growth of Internet of Things (IoT) devices have raised concerns about the security of the IoT devices. For example, several vendors are producing small IoT devices having Internet connectivity that may suffer from poor security implementations and lack mechanisms for eliminating security vulnerabilities. In order to control security risks of the IoT devices, it is necessary to detect the presence of the IoT devices in the computer network.

Some of the known methods to detect IoT devices use fingerprinting technique where a detection agent collects certain metrics from IoT device's network activity and compares this to a reference metric that has been collected in advance by a system vendor. However, this requires preliminary knowledge of the specific IoT devices such as building a fingerprint database.

Securing computer networks having vulnerable IoT devices requires identifying the types of devices being connected to the network before further actions for minimizing the damages resulting from the vulnerabilities related to such devices can be taken.

SUMMARY

Various aspects of examples of the invention are set out herein.

According to an aspect of the invention, there is provided a method comprising: detecting, by a gateway computer, a target device being connected to the computer network; detecting the target device transmitting a DNS query for resolving a hostname into an IP address; transmitting a query to a content rating system, wherein the query comprises the resolved hostname related to the DNS query of the target device; receiving, from the content rating system, a list of categorization categories assigned to the resolved hostname; determining a type of the target device on the basis of the received list of categorization categories assigned to the hostname; and generating a security related decision on the basis of the determined type of the target device.

According to an aspect of the invention, there is provided a computer apparatus that acts as a gateway computer in a computer network comprising: a memory configured to store computer program code, and a processor configured to read and execute computer program code stored in the memory, wherein the processor is configured to cause the computer apparatus to perform: detecting a target device being connected to the computer network; detecting the target device transmitting a DNS query for resolving a hostname into an IP address; transmitting a query to a content rating system, wherein the query comprises the resolved hostname related to the DNS query of the target device; receiving, from the content rating system, a list of categorization categories assigned to the resolved hostname; determining a type of the target device on the basis of the received list of categorization categories assigned to the hostname; and generating a security related decision on the basis of the determined type of the target device.

According to an aspect of the invention there is provided computer program comprising computer readable code which, when run on a computer system or server, causes the computer system or server to: detect a target device being connected to a computer network; detect the target device transmitting a DNS query for resolving a hostname into an IP address; transmit a query to a content rating system, wherein the query comprises the resolved hostname related to the DNS query of the target device; receive, from the content rating system, a list of categorization categories assigned to the resolved hostname; determine a type of the target device on the basis of the received list of categorization categories assigned to the hostname; and generate a security related decision on the basis of the determined type of the target device.

According to an aspect of the invention there is provided a non-transitory computer storage medium, wherein computer program is stored on the computer readable medium, wherein the computer program comprises computer readable code which, when run on a computer system or server, causes the computer system or server to: detect a target device being connected to a computer network; detect the target device transmitting a DNS query for resolving a hostname into an IP address; transmit a query to a content rating system, wherein the query comprises the resolved hostname related to the DNS query of the target device; receive, from the content rating system, a list of categorization categories assigned to the resolved hostname; determine a type of the target device on the basis of the received list of categorization categories assigned to the hostname;

and generate a security related decision on the basis of the determined type of the target device.

Embodiments of the invention are defined in the depended claims.

DETAILED DESCRIPTION

Figure 1:
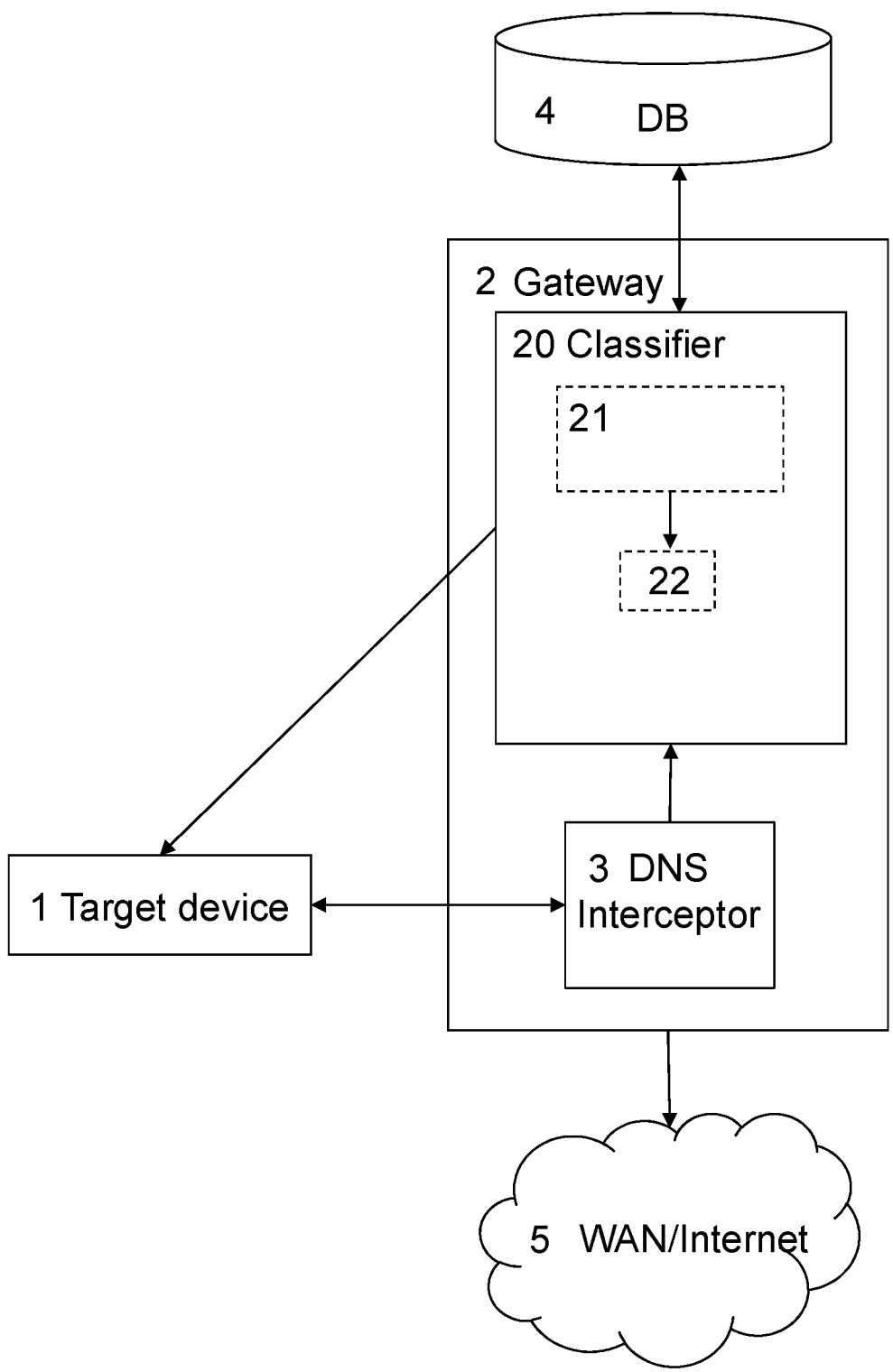
FIG. 1 is a schematic diagram of a system.

In order to provide improved determination on the type of devices having network connectivity, such as IoT devices, and thus improved network security, a method that does not require preliminary knowledge of the specific IoT devices nor building fingerprint databases is enabled. The method according to an embodiment covers a whole range of devices, not just those known to a vendor.

An example schematic diagram of a system according to the invention will be described with reference to FIG. 1. Embodiments of the present invention may, for example, relate to a system configuration in which a local network environment, such as a home or SOHO network, and the Internet are interconnected. In the local network environment, a server device serves as the Internet gateway computer 2 between local clients (here a target device 1) and a server in the Internet. The gateway 2 may be an IP networking device that forwards data packets between the target device 1 and WAN or Internet 5. In an embodiment, the gateway 2 may be a computer or a computer program configured to perform the tasks of a gateway, such as a default gateway or a router. The gateway 2 may also act as a proxy server and a firewall. The target device 1, such as an IoT device, may be a computer running a number of applications. The target device 1 and the gateway computer 1 each typically comprise a hard drive, a processor, and RAM (not shown).

In the example system of FIG. 1, the gateway 2 further comprises a classifier component 20 that updates a network activity report 21 relating to the target device 1. The classifier component 20 may use a classification criteria 22 that is a function using variables from the network activity report 21 to produce a classification result. The gateway 2 also comprises a DNS interceptor component that is capable of intercepting DNS traffic from the target device 1.

The gateway 2 may also exchange data with a content rating system database 4. A content rating system is a software system that matches hostname to the list of string labels (Content Categories) specifying the type of content that is available from the Internet resource. In one embodiment, the database 4 is maintained by a content filtering service provider. The database 4 is updated with automatically or manually generated content rating information of the Internet resources. The process of data exchange between the gateway 2 and the database 4 is performed by a processing logic comprising hardware, software or a combination of both.

Although in the example of FIG. 1, the elements are illustrated as separate or combined entities, it is possible to implement each element in any other combinations whether separate and/or combined.

Figure 2:
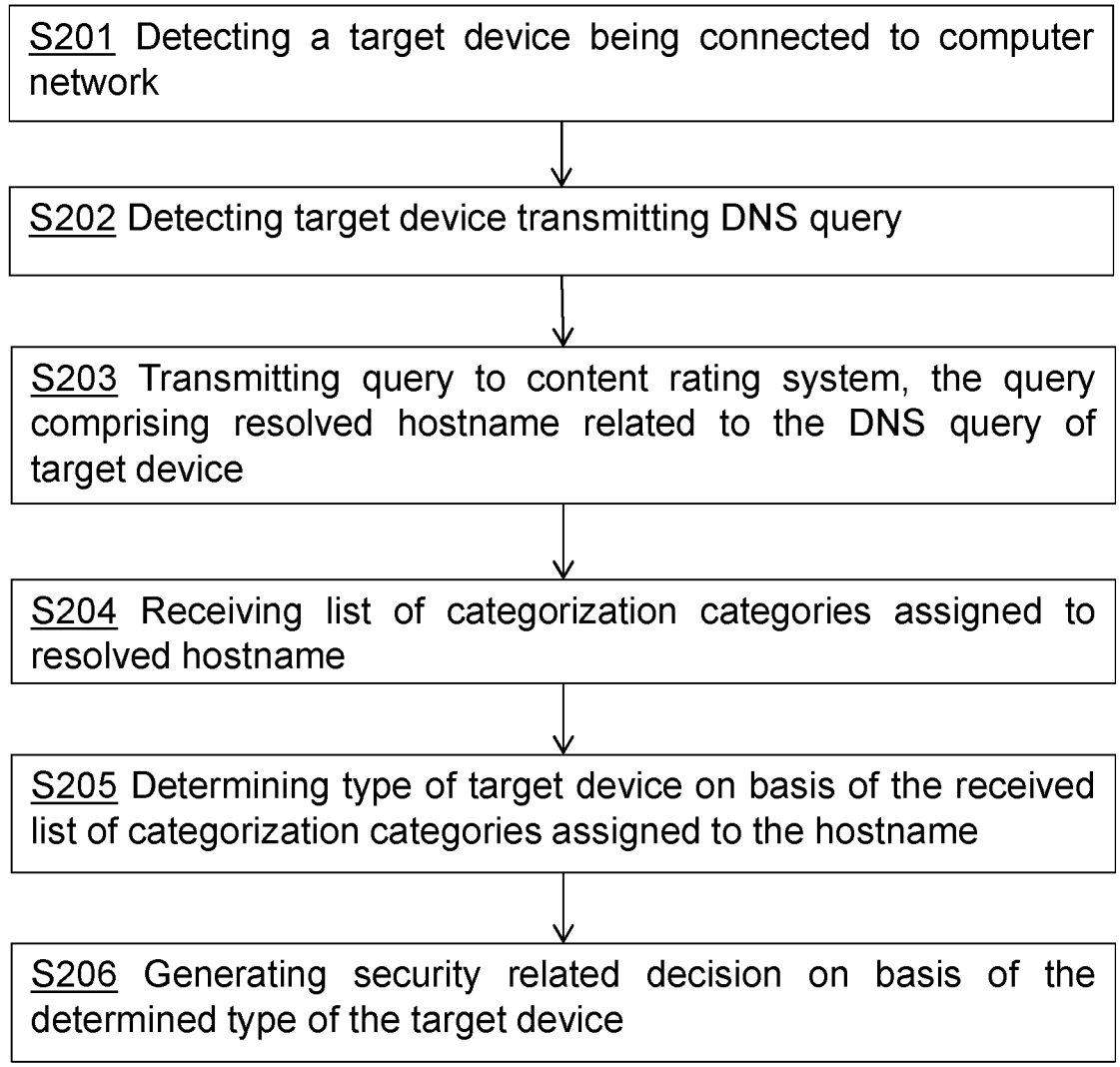
FIG. 2 is a flowchart of a network security method in a computer network according to an embodiment.

FIG. 2 is a flowchart of a method of detecting malware according to an embodiment.

In S201, a computer apparatus acting as a gateway computer in a computer network detects a target device being connected to the computer network.

In S202, the computer apparatus detects the target device transmitting a DNS query for resolving a hostname into an IP address.

In S203, the computer apparatus transmits a query to a content rating system. The query comprises the resolved hostname related to the DNS query of the target device.

In S204, the computer apparatus receives a list of categorization categories assigned to the resolved hostname.

In S205, the computer apparatus determines a type of the target device on the basis of the received list of categorization categories assigned to the hostname.

In S206, the computer apparatus generates a security related decision on the basis of the determined type of the target device.

Figure 3:
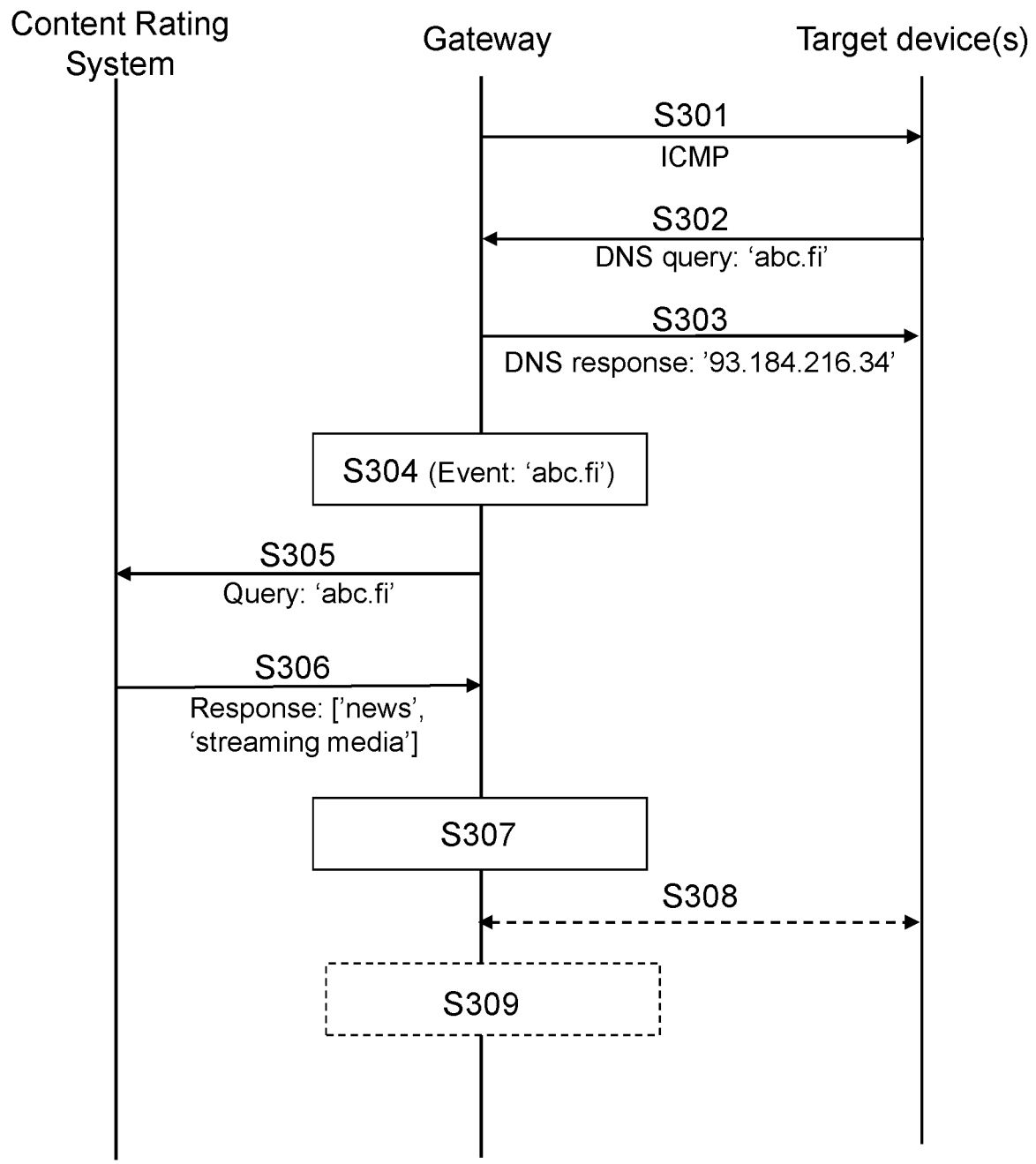
FIG. 3 is a diagram of a procedure according to exemplary embodiment of the present invention.

FIG. 3 is a signal sequence diagram that illustrates a more detailed example of the process.

In S301, the classifier component of the Gateway regularly checks whether the Target device is connected to the computer network and updates a network activity report by incrementing a counter t, the counter t being a number of time in seconds of how long the Target device has been connected to the network. The connectivity check may be implemented by using an ICMP (Internet Control Message Protocol) packet exchange or any other corresponding method.

In S302, while consuming Internet resources, the Target device makes DNS queries in order to resolve the hostnames into IP addresses. A DNS placement covers many application layer protocols at once. In S303, a DNS response message is sent to the Target device.

In S304, a DNS interceptor component in the Gateway activates when the DNS query is detected and conveys the resolved hostname to the classifier component of the Gateway.

In S305, the classifier component transmits a query to the Content Rating System relating to the hostname.

In S306, the classifier component receives back a list of categorization categories assigned to the hostname from the Content Rating System. In an embodiment, the classifier may then update one or more of the following variables in the network activity report of the Target device:

n: total number of content categories encountered, m: total number of hostnames encountered, $c_1 \ldots c_n$: string vector, the list of content categories encountered, $x_1 \ldots x_n$: number vector, number of how many times each content category was encountered, $h_1 \ldots h_m$: string vector, the list of hostnames encountered, $y_1 \ldots y_m$: number vector, number of how many times each hostname was encountered.

In S307, when the network activity report contains sufficient amount of data, a result about the type of the Target device is produced by using a classification criteria. The result may, for example, determine whether the Target device is an IoT device. The classification criteria may be implemented by using any or more of the variables in the network activity report, any threshold values or any appropriate method, for example by using the following function:

$$F(t, n, m) = \{$$
$$n > N_{max} \text{ OR } m > M_{max} \text{ -> generic}$$
$$t > T_{max} \text{ -> iot}$$
$$t <= T_{max} \text{ -> incomplete}$$
$$\}$$

where:
incomplete: the input data is not sufficient for classification
generic: Target Device is not IoT device
iot: Target Device is IoT device.

Finally, a security related decision can be generated that is based on the determined type of the Target device.

In S308 and S309, when identifying the determined type of the target device as being vulnerable to a security threat, the target device and/or an application/service related to the target device may be handled by one or more of: limiting the connectivity of the target device and/or the application/service to a certain set of verified resources (e.g. 'sandbox'), terminating a process or an action of the target device and/or an application/service, removing or otherwise making safe the target device and/or application/service and performing a further malware scan on the target device and/or application/service. Further, upon identifying the determined type of the target device as being vulnerable to a security threat, one or more following actions may be taken: sending from the gateway computer to a security server details of actions taken on the target device, sending from the security server to the gateway computer an indication as to whether or not the target device is malicious or suspicious, sending from the security server to the target device instructions for handling the target device and/or application/service, prompting the target device to kill and/or remove application/service.

In an embodiment, it is also possible that data relating to any target devices, applications or services exhibiting identified vulnerabilities/misconfigurations are stored in a database for further analysis/monitoring. In addition, a security application/server may provide a warning about the detected vulnerability/misconfiguration.

Next some use case examples of an embodiment according to the invention are described. The following classification examples enable determining whether the target devices are IoT devices by using the threshold criteria described previously in relation to the S307 of FIG. 3 and the threshold values of:

$N_{max}=10$
$M_{max}=10$
$T_{max}=1200$

Example 1. XX C2 camera
t=1200
c=["government", "other", "popular"]
h=["glassey.com", "symmetricom.com", "myfoscam.com", "nist.gov", "bldrdoc.gov", "nuri.net", "windows.com"]
n=3
m=7
F(1200, 3, 7)=iot Example 2. XX IoT Hub
t=1200
c=[ ]
h=["cozify.fi"]
n=0
m=1
F(1200, 0, 1)=iot Example 3. XX NAS
t=1200
c=["other"]
h=["ad.jp", "twonky.com"]
m=1
n=2
F(1200, 1, 2)=iot Example 4. XX laptop
t=600
c=["adserving", "adult", "blogs", "business", "certauthority", "dynamic", "fragfinn", "games", "health", "internet portals", "news", "other", "popular", "redirect", "search engines", "social networking", "software download", "sport", "stock quote", "streaming media", "tracking_cookie", "tracking_domain", "weapons"]
h=["adnxs.com", "celtra.com", "akadns.net", "branch.io", "snaperaft.io", "contextweb.com", "mozaws.net", "fwupd.org", "phicdn.net", "cloudfront.net", "amazonaws.com", "nexac.com", "section.io", "gnome.org", "appnexusgslb.net", "scorecardresearch.com", "googleapis.com", "casalemedia.com", "addthis.com", "elasticbeanstalk.com", "omtrdc.net"]
m=23
n=49
F(600, 23, 49)=generic Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A network security method in a computer network, the method comprising:
   detecting, by a gateway computer, a target device being connected to the computer network;
   updating a network activity report of the target device based on detection of the target device being connected to the computer network;
   detecting the target device transmitting a DNS query for resolving a hostname into an IP address;
   transmitting a query to a content rating system, wherein the query comprises the resolved hostname related to the DNS query of the target device;
   receiving, from the content rating system, a list of categorization categories assigned to the resolved hostname;
   determining a type of the target device on the basis of the received list of categorization categories assigned to the hostname according to a classification criteria that includes one or more of the variables of the network activity report; and
   generating a security related decision on the basis of the determined type of the target device.

2. The method according to claim 1, the method further comprising detecting the target device being connected to the computer network by a classifier component of the gateway computer, wherein the classifier component updates the network activity report of the target device.

3. The method according to claim 2, wherein a DNS interceptor component of the gateway computer is activated on the basis of detecting the target device transmitting the DNS query and the method further comprising conveying the resolved hostname to the classifier component that transmits the query to the content rating system.

4. The method according to claim 2, the method further comprising maintaining, by the classifier component, the network activity report, wherein the network activity report is updated with any one or more of the following variables: time of how long the target device has been connected to the computer network, total number of content categories encountered, total number of hostnames encountered, list of content categories encountered, number of how many times each content category is encountered, list of hostnames encountered, number of how many times each hostname is encountered.

5. The method according to claim 1, wherein the determining of the type of the target device further comprises determining whether the target device is an IoT-device.

6. The method according to claim 1, the method further comprising identifying the determined type of the target device as being vulnerable to a security threat; and handling the target device and/or an application/service related to the target device by one or more of: limiting connectivity of the target device and/or the application/service, terminating a process or an action of the target device and/or an application/service, removing or otherwise making safe the target device and/or application/service and performing a further malware scan on the target device and/or application/service.

7. The method according to claim 6, upon identifying determined type of the target device as being vulnerable to a security threat, further comprising at least one of: sending from the gateway computer to a server details of actions taken on the target device; sending from the server to the gateway computer an indication as to whether or not the target device is malicious or suspicious; sending from the server to the target device instructions for handling the target device and/or application/service; prompting the target device to kill and/or remove application/service.

8. A computer apparatus acting as a gateway computer in a computer network comprising:
a memory configured to store computer program code, and
a processor configured to read and execute computer program code stored in the memory,
wherein the processor is configured to cause the computer apparatus to perform:
detecting a target device being connected to the computer network;
update a network activity report of the target device based on detection of the target device being connected to the computer network;
detecting the target device transmitting a DNS query for resolving a hostname into an IP address;
transmitting a query to a content rating system, wherein the query comprises the resolved hostname related to the DNS query of the target device;
receiving, from the content rating system, a list of categorization categories assigned to the resolved hostname;
determining a type of the target device on the basis of the received list of categorization categories assigned to the hostname according to a classification criteria that includes one or more of the variables of the network activity report; and
generating a security related decision on the basis of the determined type of the target device.

9. The computer apparatus according to claim 8, further comprising a classifier component that is configured to detect the target device being connected to the computer network and to update the network activity report of the target device.

10. The computer apparatus according to claim 9, wherein the classifier component if further configured to maintain an network activity report that is updated with any one or more of the following variables: time of how long the target device has been connected to the computer network, total number of content categories encountered, total number of hostnames encountered, list of content categories encountered, number of how many times each content category is encountered, list of hostnames encountered, number of how many times each hostname is encountered.

11. The computer apparatus according to claim 8, further comprising a DNS interceptor component of the gateway computer that is configured to be activated on the basis of detecting the target device transmitting the DNS query and the processor is further configured to cause the computer apparatus to perform: conveying the resolved hostname to the classifier component that transmits the query to the content rating system.

12. The computer apparatus according to claim 8, wherein the determining of the type of the target device further comprises determining whether the target device is an IoT-device.

13. The computer apparatus according to claim 8, wherein the processor is further configured to cause the computer apparatus to perform: identifying the determined type of the target device as being vulnerable to a security threat; and handling the target device and/or an application/service related to the target device by one or more of: limiting connectivity of the target device and/or the application/service, terminating a process or an action of the target device and/or an application/service, removing or otherwise making safe the target device and/or application/service and performing a further malware scan on the target device and/or application/service.

14. The computer apparatus according to claim 13, upon identifying determined type of the target device as being vulnerable to a security threat, the processor is further configured to cause the computer apparatus to perform at least one of: sending from the gateway computer to a server details of actions taken on the target device; sending from the server to the gateway computer an indication as to whether or not the target device is malicious or suspicious; sending from the server to the target device instructions for handling the target device and/or application/service; prompting the target device to kill and/or remove application/service.

15. A computer program product comprising a non-transitory computer readable medium and a computer program, wherein the computer program is stored on the computer readable medium, and wherein the computer program comprises computer readable code which, when run on a computer system or server, causes the computer system or server to:
detect a target device being connected to a computer network;
update a network activity report of the target device based on detection of the target device being connected to the computer network;
detect the target device transmitting a DNS query for resolving a hostname into an IP address;
transmit a query to a content rating system, wherein the query comprises the resolved hostname related to the DNS query of the target device;

receive, from the content rating system, a list of categorization categories assigned to the resolved hostname;

determine a type of the target device on the basis of the received list of categorization categories assigned to the hostname according to a classification criteria that includes one or more of the variables of the network activity report; and generate a security related decision on the basis of the determined type of the target device.

16. The computer program product according to claim 15, wherein the gateway computer includes a classifier component, wherein the classifier component updates the network activity report of the target device.

17. The computer program product according to claim 16, wherein a DNS interceptor component of the gateway computer is activated on the basis of detecting the target device transmitting the DNS query, and wherein the computer readable code which, when run on a computer system or server, further causes the computer system or server to convey the resolved hostname to a classifier component that transmits the query to the content rating system.

18. The computer program product according to claim 16, the computer readable code which, when run on a computer system or server, further causes the computer system or server to:

maintain, by the classifier component, the network activity report, wherein the network activity report is updated with any one or more of the following variables: time of how long the target device has been connected to the computer network, total number of content categories encountered, total number of hostnames encountered, list of content categories encountered, number of how many times each content category is encountered, list of hostnames encountered, and number of how many times each hostname is encountered.

19. The computer program product according to claim 16, wherein computer readable code which, when run on a computer system or server, further causes the computer system or server to:

identify the determined type of the target device as being vulnerable to a security threat; and handle the target device and/or an application/service related to the target device by one or more of:

limiting connectivity of the target device and/or the application/service, terminating a process or an action of the target device and/or an application/service, removing or otherwise making safe the target device and/or application/service and performing a further malware scan on the target device and/or application/service.

20. The computer program product according to claim 18, wherein the computer readable code which, when run on a computer system or server, further causes the computer system or server to:

upon identifying the determined type of the target device as being vulnerable to a security threat:

send from the gateway computer to a server details of actions taken on the target device;

send from the server to the gateway computer an indication as to whether or not the target device is malicious or suspicious;

send from the server to the target device instructions for handling the target device and/or application/service; and prompt the target device to kill and/or remove application/service.

* * * * *